July 30, 1974   H. S. CHAPMAN   3,826,702
METHOD OF IN-SITU HEAT SEAL SLEEVING FOR LARGE ROLLS
Filed April 21, 1972   2 Sheets-Sheet 1
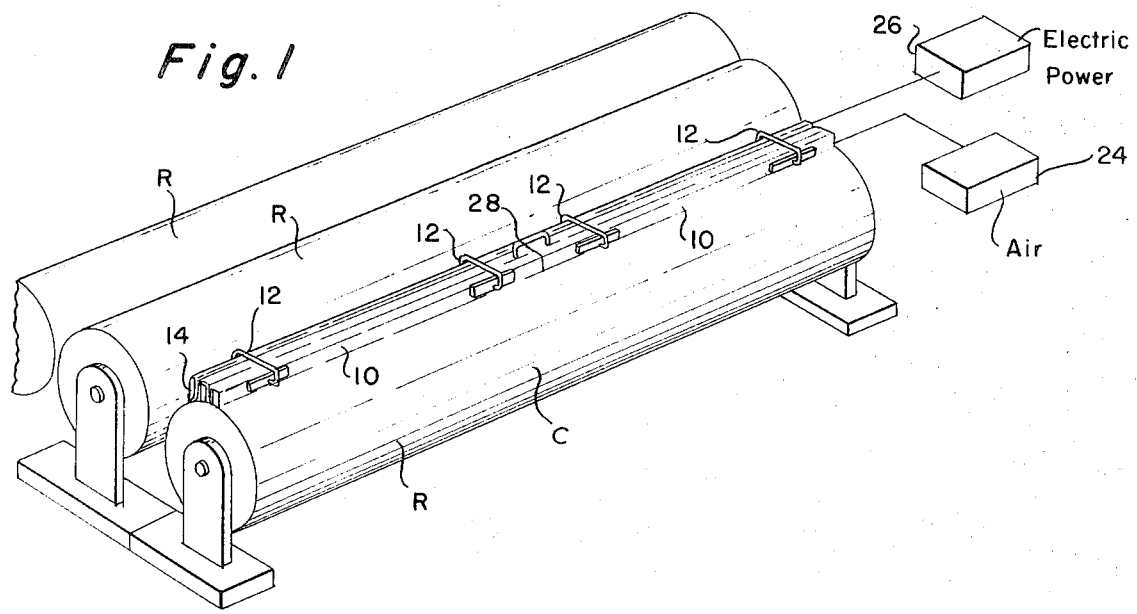
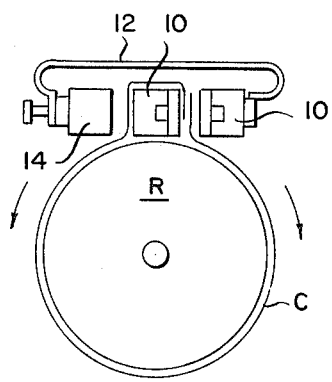
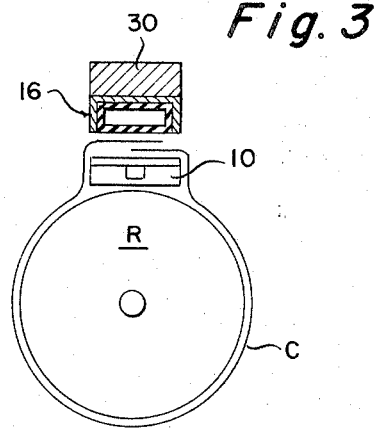
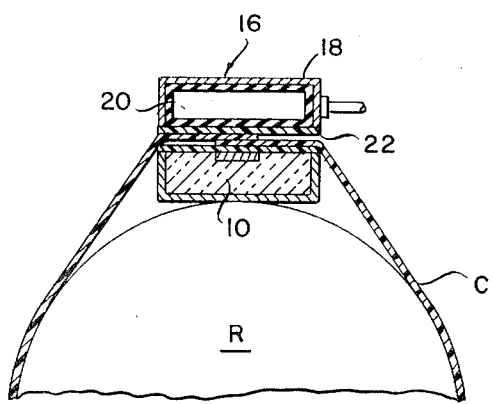
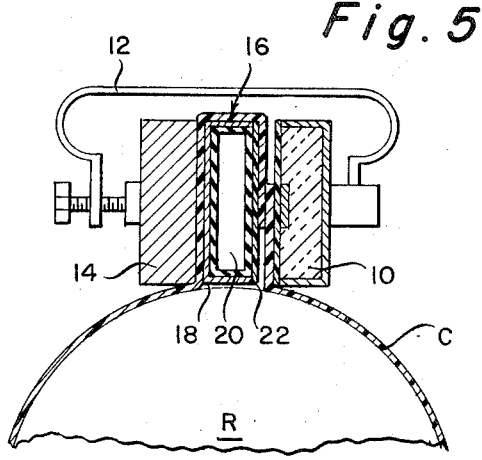

July 30, 1974   H. S. CHAPMAN   3,826,702
METHOD OF IN-SITU HEAT SEAL SLEEVING FOR LARGE ROLLS
Filed April 21, 1972   2 Sheets-Sheet 2

United States Patent Office 3,826,702
Patented July 30, 1974

3,826,702
METHOD OF IN-SITU HEAT SEAL SLEEVING
FOR LARGE ROLLS
Harry Samuel Chapman, R.D. 3, Box 328, Hickory Hill,
Oxford, Pa. 19363
Continuation-in-part of application Ser. No. 824,411, May
13, 1969, now Patent No. 3,660,210. This application
Apr. 21, 1972, Ser. No. 246,268
Int. Cl. B65h 8/00
U.S. Cl. 156—86
14 Claims

ABSTRACT OF THE DISCLOSURE

Heat sealing organic polymeric materials, especially fluorocarbon films, to form tubular sleeves about large and elongated rolls prior to heat-shrinking the sleeve snugly about the roll, thereby to effect rapid in-situ roll sleeving.

CROSS-REFERENCE TO RELATED APPLICATION

This application is a continuation-in-part application of parent application Ser. No. 824,411, filed May 13, 1969, now Pat. No. 3,660,210.

THE INVENTION

The present invention relates to a method for heat-sealing organic thermoplastic polymeric materials and, more particularly, is directed to a novel sealing method for heat-sealing film structures of fluorocarbon polymeric material about large roll structures.

The heat-sealing of organic thermoplastic polymeric materials by the application of heat and pressure is a well known method for uniting such materials to provide integral structures thereof such as, for example, tubular film structures. For instance, a flat sheet, web or film structure of organic thermoplastic material may be formed into a tubular structure by contacting two opposed edges thereof in either abutting or overlapping relation and heat-sealing or welding the polymeric material along the line of contact thereof as by the application of suitable heat and pressure thereto to effect fusion and joining of the polymeric material thereat. The foregoing heat-sealing technique is especially useful for forming large tubular film structures of heat-shrinkable polymeric materials that are adapted to be installed upon large roller elements and heat-shrunk thereon to provide a covering on such rolls of such suitable and desirable polymeric material. For example, each of U.S. Pats. 3,426,118 and 3,426,119 discloses a method for applying a tubular film of fluorinated ethylene polymeric resin onto the surface of large diameter rollers by heat-shrinking an integral tubular film thereon wherein the tubular film was fabricated from a flat sheet of polymeric resin by abutting two opposed edges of the flat sheet and applying heat and pressure to the region of the abutting film edges to fuse and join the polymeric material thereat and provide a tubular film structure. One major drawback and disadvantage of the heat-sealing apparatus and method described in the aforementioned patents resides in the impracticability thereof for forming a tubular film structure from a flat film structure in-situ on a large diameter roller element.

According to the present invention there is provided a method for heat-sealing tubular film structures of organic polymeric material in-situ on large diameter roll structures which comprises wrapping a flat film or sheet of heat-shrinkable organic polymeric material, preferably fluorocarbon polymeric material, around said roll structure; contacting opposed edges of said film; spot-tacking the lapped edges at longitudinally spaced points; maintaining said opposed edges secured in firm contact in a sealer bar assembly and heating the static sealer bar thereby to heat said contacting opposed edges of said film and fuse and join the same whereby to form a unitary tubular film structure which circumscribes said roll structure; and thereafter applying heat to said tubular film structure thereby to shrink said tubular film structure into intimate contact with the surface of said roll structure for providing a covering on the surface of said roll structure.

In carring out the method of the present invention, there is further provided a heat-sealing device, hereinafter referred to as a static sealer bar, comprising a body or base member having a recess on one surface thereof, said recess extending substantially the entire length of said surface; an electrical resistance-type heating element disposed in said recess; a first layer of high temperature resistant material overlying said surface of said base member; a layer of high temperature resistant elastomeric-type material overlying the exposed surface of said first layer of high temperature resistant material; and preferably a second layer of high temperature resistant material overlying the exposed surface of said layer of high temperature resistant elastomeric-type material. The layer of high temperature resistant elastomeric-type material may be replaced by a thin metallic band preferably of stainless steel. This latter embodiment of the static sealer bar is especially useful for heat-sealing thin film structures of polymeric material, e.g., film structures that are below about 10 mils in thickness.

The nature and advantages of the method of the present invention will be more clearly understood from the following description and the several views illustrated in the accompanying drawings wherein like reference characters refer to the same parts throughout the several views and in which:

FIG. 1 is a perspective semi-diagrammatic illustration of a multiple large roll installation whereat the roll covering method of the invention finds utility;

FIG. 2 is a side sectional view illustrating the method of heat sealing the film in-situ on a large diameter roll with a radially extending lap seal, with the sealer bar being relatively enlarged for clarity;

FIG. 3 is a side sectional view similar to FIG. 2 illustrating a slightly different arrangement of sealer bar means;

FIG. 4 is an enlarged fragmentary view of the sealer bar means of FIG. 3 prior to the application of pressure thereto;

FIG. 5 is an enlarged fragmentary view of a further form of sealer bar means in carrying out the invention;

Figure 6:
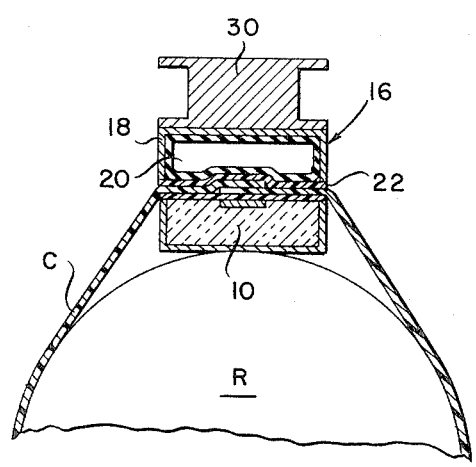
FIG. 6 illustrates the sealer bar means of FIG. 4 under pressure.

Heretofore in covering rolls and other tubular members with fluorocarbon or similar sleeves it has been customary to prefabricate the sleeve at a suitable facility, transport the sleeve to the site of the roll or rolls to be sleeved, remove the roll to be sleeved from its bearing mounts, and telescope and sleeve over the roll. Thereafter following any final treatment, the covered roll would be reattached in its mounts.

One reason for off-situ prefabrication of the sleeves as heretofore performed is the relative difficulty of achieving a satisfactory heat seal with hard-to-handle materials such as fluorocarbon polymers. The unique seal bar 10 described at length in the parent application to be issued as Pat. 3,660,210, however, reliably effects the longitudinal seal S of the polymeric material when utilized in conjunction with the disclosed handling and clamping technique of the subject invention, whereby on-site sleeving of rolls can now be economically, efficiently and reliably carried out.

The importance of on-site sleeving can be realized when it is appreciated that rolls as at R in FIG. 1 as employed in textile finishing mills, paper driers, printing apparatus and the like frequently have a length on the order of 10, 20 or 30 feet, and a diameter around 3 to 4 feet or so. Just one such roll or drying can in a paper mill may well weigh up to 20 tons in having a one inch thick steel wall to withstand steam pressures on the order of 300 p.s.i. Further it should be realized that in the paper industry it is not uncommon to have 50 or 100 of such rolls in a single facility. As a consequence, the manpower and equipment downtime required to remove such massive rolls from their mount for telescopic association of a prefabricated sleeve therewith is considerable. The loss of several days is not uncommon.

In sharp contrast, the in situ seaming and sleeving of rolls R by the present invention completely eliminates the problem of dismantling the roll mounts, requires far less manpower, and equipment downtime is reduced to hours rather than days in providing coverings on the rolls R. The relative economies are nothing short of astonishing. This is especially the case in paper mills wherein the Fourdrinier screen requires periodic replacement. The screen can be replaced in eight hours or so, and during this relatively brief downtime, a large roll can be sleeved with polymeric film in accordance with my invention, whereby no additional time is lost. In the course of routine screen replacements, all dryer drums can be eventually sleeved with the fluorocarbon polymer with resultant benefit to the papermaking process as the sticky, clayey moist, freshly screened pulp no longer seeks to adhere to the dryer rolls.

As above indicated, the static sealer bars of the parent patent are especially adapted for heat-sealing flat film or sheet structures of polymeric material in situ on large diameter roll structures. The procedure is depicted schematically in FIG. 2 which depicts a roll structure R having a flat film or sheet C of heat-shrinkable polymeric material such as fluorocarbon polymer wrapped therearound. One end of film C passes under a static sealer bar 10 whereas the other end of film C passes over a similar static sealer bar 10 and the edges of the film are overlapped slightly and firmly secured in intimate contact between the static sealer bars 10, 10. A useful technique for maintaining the edges of film in overlapped relation prior to clamping and full longitudinal sealing is to spot weld the overlapped film along the region of overlap. This may readily be done with an electric resistance-heated soldering gun, and is very advantageous for initially maintaining the overlapped film in proper alignment between the static sealer bars.

Static sealer bars 10, 10 exert or transmit a pressure force to the film C held therebetween; the pressure force is provided by any suitable means such as a plurality of clamping devices 12. FIG. 2 also shows the use of a protective element 14 of any suitable material such as wood or metal which is interposed between a static sealer bar 10 and clamp 12 and which provides a surface for contacting clamp 12 thereby protecting the surface of film C. After installing the film C and static sealer bar assembly 10 on a roll R, the static sealer bars are electrically energized thereby to heat the polymeric material in the region of the film that is secured therebetween. The heating is continued for a time sufficient to effect plastic flow of the polymeric material and to obtain fusion at S, FIG. 8, of the polymeric material in the region of the film that is held between one or two static sealer bars 10. The time for heating will depend of course upon such factors as the thickness of the film structure and may readily be determined by anyone skilled in the art. Ordinarily, heating times of about 10 minutes and about 25 minutes are satisfactory when utilizing fluorocarbon polymer films C of about 10 and about 20 mils thickness, respectively. Thereafter, the static sealer bar or bars 10 are de-energized and the film held therebetween is allowed to cool while being maintained under pressure. After cooling, the static sealer bars are removed (FIG. 8) and the unitary tubular film C enwrapped on rolls R is heat-shrunk on the roll in the conventional manner by applying heat thereto as described in U.S. Pats. Nos. 3,426,118 and 3,426,119 to result in the sleeved roll of FIG. 9.

Figure 7:
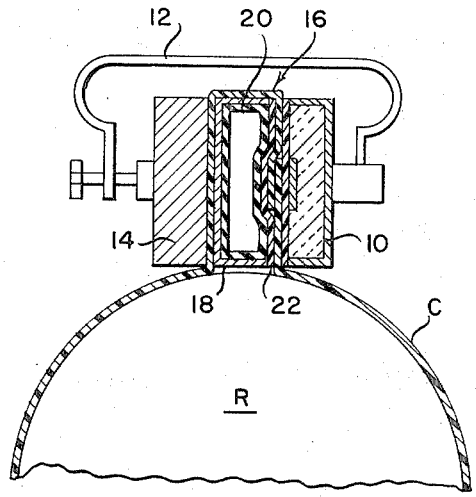
FIG. 7 illustrates the sealer bar means of FIG. 5 under pressure.

In sheathing relatively larger and longer rolls, the sheer expanse and weight of the fluorocarbon polymer C result in substantial seam-separating forces as indicated by the downwardly directed arrows in FIG. 2. This adverse effect is reduced by the practice of wrapping the film C about three sides of sealer bar 10 in FIG. 2, or sealer bar 16 in FIGS. 5 and 7. In this technique, the film C is clamped in a first circumferential zone along the length of the roll adjacent sealer bar 10 at the overlapped film ends, and is also clamped at least at spaced intervals in a second circumferential zone along the roll by clamp blocks 14. Desirably, the blocks 14 are substantially longitudinally coextensive with the sealer bars.

In so disposing the inside member comprising the sealer bar 10 in FIG. 2 or sealer bar 16 in FIG. 5 in the illustrated position, the inside bar is initially slipped under the spot-tacked sleeve with the active face of the bar disposed substantially tangentially of the drum. The outside sealer bar 10 is then superposed on the film lap much as seen in FIG. 4. With the film lap now disposed within the sealer bar assembly, the inside and outside sealer bar members are gripped and turned 90° to the FIG. 2 or FIG. 5 position to dispose the film lapped edges substantially radially of the drum, after which the assembly is secured by the clamps 12.

By this method whereby the film is partially "rolled up" on a bar with the lap disposed substantially radially of the roll R, (1) positive clamping force can be exerted by the screw clamp or clamps 12, (2) seam-separating forces exerted on the initially spot-tacked film lap are nullified by blocks 14 and in view of the fact that pulling forces existing on the film adjacent block 14 cause the film to wrap tightly against heater bar 10 or pressure bar 16 with less resultant shear force effective at the film lap, and (3) a full-length seam S of the difficulty seamed polymeric material C is achieved.

While in FIG. 2 two sealer bars 10 are shown between which the film lap is clamped, in the form shown in FIG. 5 one sealer bar 10 is replaced by a pressure bar 16. In essential respects, pressure bar 16 comprises a rigid support such as U-shaped channel 18 within which is received an elongated inflatable bladder 20. Such an arrangement is generally known and is described more fully in Pat. 2,960,147 to Ferrell.

Pressure bar 16 further includes a layer of high temperature resistant material 22 of about 5 mils thickness which is preferably a polyimide, such as the material trademarked "Kapton." Similar material is employed with the sealer bars 10.

With this construction, after clamping, a uniform and predetermined pressure may be applied along the length of the film lap by inflating bladder 20 as desired from a suitable valved and controllable air source 24 thereby to form an excellent seam S.

As indicated in FIG. 1, where the length of the roll being covered dictates, a plurality of heater bars 10 may be connected end-to-end with suitable electrical connections therebetween and in external connection to a source of controllable electric energy. Likewise, the bladders 20 of adjacent pressure bar 16 may be connected as by tubing lengths 28. If the roll length is in excess of the sealer bar assembly or assemblies available, the full length seal may be achieved in two or more successive stages, advancing the seal bar along the lap.

With smaller rolls, or with film material of less bulk and weight, the slightly modified technique of FIGS. 3, 4 and 6 may be employed. As shown, the film is not rolled up or wrapped around a seal assembly member but merely lapped, spot-tacked and overlaid on sealer bar 10 slipped therebeneath. Pressure bar 16 is superposed thereon.

In this method of sealing, clamp members 12 may not feasibly be employed. The requisite clamping pressure is effected by the application of weights 30 upon the bar 16. Further pressure may be applied by anchoring a weight 30 in the form of an I-beam to the roll bearing mounts and tensioning the anchoring lines. Alternatively, the entire roll and seal assembly may be circumferentially banded or cinched with cables, care being taken to protect the sheath material as the cinch is contracted to apply pressure to the seal assembly.

Figure 8:
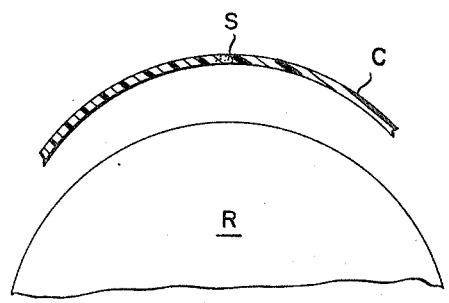
FIG. 8 illustrates the sealed film about the roll subsequent to the removal of the sealer bar means.

After formation and cooling of seal S, FIG. 8, the sealer bar assembly is removed and the sleeve shrunk tightly onto the drum by the application of heat.

Heat may be provided from any convenient source such as a hot air blower. In the case of sheathing Yankee dryer rolls or the like, steam admitted within the roll quickly and uniformly effects the desired shrinkage.

Figure 9:
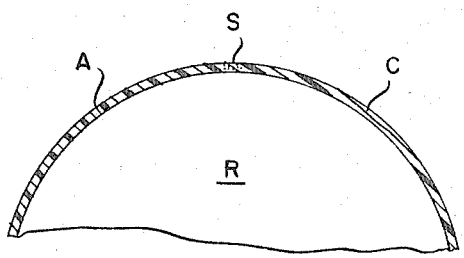
FIG. 9 illustrates the sealed sleeve in tight shrink fit about the roll.

To insure that there will be no relative rotation between the finished sleeve C and roll R, or undesirable axial translation of the sleeve on the roll, a suitable adhesive is applied at A, FIG. 9, between the covering and the roll surface. The adhesive may be injected at several points as by a needle, and thereafter the sheathed roll is squeegeed to disperse the adhesive substantially uniformly between the roll and sheath.

The preferred polymeric material utilized in the method of the present invention is a fluorocarbon polymer. The expressions "fluorocarbon polymer" and "fluorocarbon polymeric material" as used herein mean copolymers of tetrafluoroethylene and hexafluoropropylene (FEP). The fluorocarbon polymers are extensively described in patents such as, for example, U.S. 2,833,686, U.S. 2,946,763 and U.S. 3,051,683.

What is claimed is:

1. A method for applying a tubular film covering of fluoropolymer material having a relatively high sealing temperature to an elongated roll structure comprising the steps of:

wrapping a sheet of said material having heat-shrinkable properties around said roll structure, contacting opposed edge margins of said sheet along the length of said roll structure, gripping elongated portions of said sheet adjacent and upon said contacting edge margins thereof in an elongated static seal bar assembly to maintain the contacting edge margins in fixed relation relative to said static seal bar assembly, applying static clamping pressure at and through said contacting edge margins without relative motion between said static seal bar assembly and said edge margins while heating said contacting edge margins to a temperature fusing the contacting edge margins into an elongated seam, and causing said seam to cool, thereby to form a unitary tubular film covering about said roll structure.

2. The method of Claim 1 wherein said fluoropolymer is FEP.

3. The method of Claim 1 including the step of disposing said opposed film edge margins in lapped relation.

4. The method of Claim 3 including the step of disposing the lapped film edge margins in a plane substantially radially of the roll structure prior to heating and fusing of the film.

5. The method of Claim 3 including the step of applying clamping pressure across said lapped edge margins in a direction substantially tangentially of the roll structure.

6. The method of Claim 3 including the step of applying clamping pressure across said lapped edge margins in a direction substantially radially of the roll structure.

7. The method of Claim 1 including the step of applying substantially uniform fluid pressure through said sealer bars.

8. The method of Claim 1 including the step of spot tacking the opposed edges at intervals along their length prior to heating and fusing the same.

9. The method of Claim 1 including the further step of heat-shrinking said tubular film into intimate covering contact with said roll structure.

10. The method of Claim 9 including the further step of injecting adhesive between the shrunk film and the roll.

11. A method for covering roll structures with protective films comprising the steps of:

wrapping a sheet of a heat shrinkable, high sealing temperature fluoropolymer around said roll, contacting opposed edge margins of said sheet longitudinally of said roll structure, spot-tacking said contacting edge margins at intervals along their length, inserting a static seal bar member between said sheet edge margins and said roll structure along the length thereof to underlie said edge margins radially of the roll, overlying a static seal bar member upon said edge margins along the length thereof, holding said seal bar members to secure firmly the contacting sheet edge margins therebetween, turning said seal bar members and thereby said clamped sheet edge margins through substantially 90° to dispose said sheet edge margins in a plane substantially radially of said roll, heating said edge margins to a temperature sufficiently high to fuse and join the contacting edge margins, thereby to form a unitary tubular film covering about said roll structure, cooling said fused margins, unclamping and removing said seal bars, and heat-shrinking said tubular film into intimate contact with said roll.

12. The method of Claim 11 including the further step of disposing a backing bar against the sheet portion adjacent the face of the inserted seal bar remote from the edge margins after the turning step, and clamping said backing bar to the seal bar assembly.

13. The method of Claim 1 including the steps of initially positioning the static seal bar assembly on opposite sides of said contacting edge margins along a line extending generally radially of said roll structure, and thereafter turning said seal bar assembly and the edge margins therein through substantially 90° to dispose the static seal bar assembly on opposite sides of said contacting edge margins along a line extending generally tangentially of said roll structure.

14. A method for heat sealing fluoropolymer films having a relatively high sealing temperature to form a tubular film structure for sleeving a roll comprising the steps of:

bending a sheet of said fluoropolymer film into a tubular configuration to dispose edge margins of said sheet in adjacent relation, gripping elongated portions of said sheet adjacent and upon said edge margins thereof between opposed elongated members of a seal bar assembly, rotating said seal bar assembly and the opposed film margins clamped therein relative to the remainder of said tubular film through about 90° to wrap the film about the surface of a seal bar member remote from the surface thereof gripping said film edge margins, applying an elongated member to the film overlying said wrapped seal bar surface, clamping said elongated member, said seal bar assembly and the film portions therebetween into a substantially rigid assembly, and heating said edge margins to fuse and join the same into an elongated seam, thereby to form an elongated tubular fluoropolymer sleeve.

References Cited

UNITED STATES PATENTS

| | | | |
|---|---|---|---|
| 3,426,118 | 2/1969 | Chapman et al. | 156—86 |
| 3,015,601 | 1/1962 | Fener | 156—515 |
| 3,528,876 | 9/1970 | Von Clavé-Bouhaben | 156—218 |
| 3,426,119 | 2/1969 | Chapman et al. | 156—86 |
| 2,440,664 | 4/1948 | Irons | 156—196 |
| 3,481,805 | 12/1969 | Holmes et al. | 156—86 |
| 2,565,161 | 8/1951 | Wilmotte et al. | 156—580 |
| 3,749,621 | 7/1973 | Shoffner | 156—86 |

CHARLES E. VAN HORN, Primary Examiner

F. FRISENDA, Jr., Assistant Examiner

U.S. Cl. X.R.

156—187, 215, 218, 304, 311